DE LEON DAVIS.
TIRE.
APPLICATION FILED OCT. 5, 1917.
1,374,637. Patented Apr. 12, 1921.
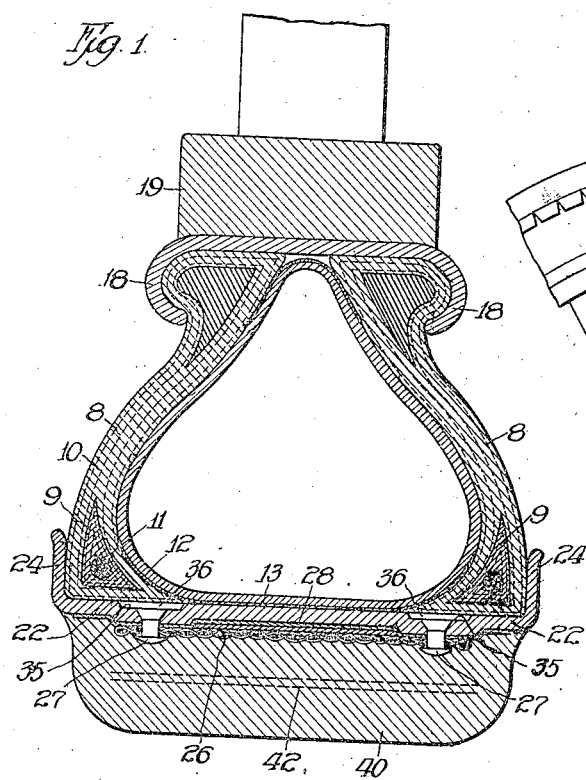
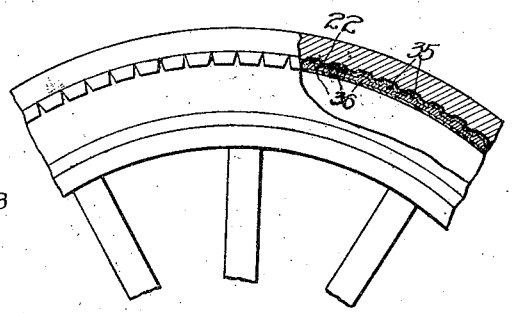
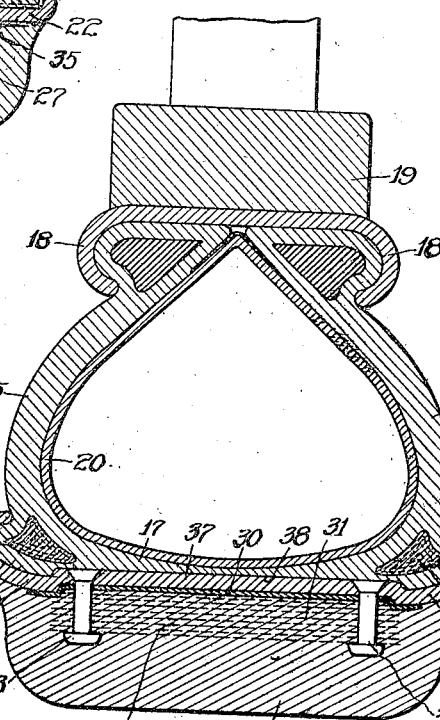
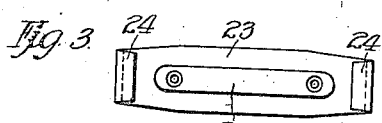
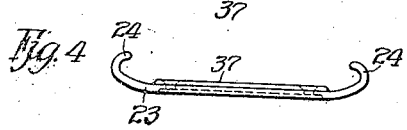
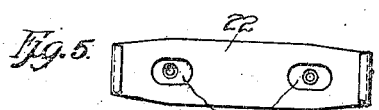
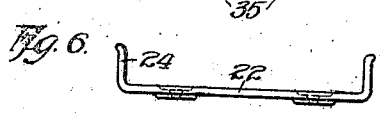
Witness:
Inventor
D Leon Davis
By Luther Johns
Atty

UNITED STATES PATENT OFFICE.

DE LEON DAVIS, OF RICHMOND, VIRGINIA, ASSIGNOR TO UNITY TIRE & MFG. CO., A CORPORATION OF DELAWARE.

TIRE.

1,374,637.　　　　　　Specification of Letters Patent.　　Patented Apr. 12, 1921.

Application filed October 5, 1917. Serial No. 194,843.

*To all whom it may concern:*

Be it known that I, DE LEON DAVIS, a citizen of the United States, residing in the city of Richmond, county of Henrico, and State of Virginia, have invented certain new and useful Improvements in Tires, of which the following is a specification.

My invention relates to tires. Its principal object is to provde a simple, strong, durable and resilient tire for a wheel, for instance such as used on automobiles. It is a specific object to provide an improvement in the tire construction illustrated, described and claimed in my co-pending application, Serial No. 5464, filed February 1, 1915, to which reference is made.

The principal departures shown herein from the invention of my said co-pending application are in interlocking means between the tire casing walls and the removable tread element, and in a modification of the tire walls adjacent to the removable annular tread. I also show the application of the improvements to a "straight-side" tire as well as to the clencher construction shown in my said co-pending application.

In the accompanying drawings, which form a part of this specification, the interlocking means herein referred to are shown in what I now consider their most advantageous construction, which construction is illustrated in several slightly modified forms or adaptations for particular arrangements or forms of tire casing walls. In these drawings Figure 1 is a cross sectional view showing relatively small projections on outward widely spaced apart and disconnected peripheral portions of the tire casing side walls interlocked with recesses in the tread retaining cross bars or plates, the view showing also straight-side wall construction with a flexible inextensible element in the bead cores;

Fig. 2 is a similar view to that of Fig. 1 showing widely spaced apart outward portions of the tire casing side walls connected by a casing tread wall substantially flat cross-wise, and showing interlocking means for the tread comprising an inwardly extending longitudinal projection on the cross bars or plates engaging cross recesses of similar length and form in the tread wall of the casing;

Figs. 3 and 4 are respectively face and side views, on a reduced scale, of the tread-holding cross bars or plates of Fig. 2;

Figs. 5 and 6 are similar views to those of Figs. 3 and 4 showing the cross plates of Fig. 1; and Fig. 7 is a fragment of a wheel showing partly in side view and partly in sectional view the improvements of Fig. 1 thereon.

Referring to Fig. 1 the annular side walls 8 are provided with straight-side beads which are relatively widely spaced apart. The bead cores 9 are shown as having embedded therein respectively a flexible and inexpansible ring-shaped element 11 which may be of wires, as shown, or of any other suitable material. The tire construction includes an inner tube 12 and a strip of fabric 13 adapted to protect the tube. In Fig. 2 the side walls 15 have the clencher type of beads 16 at their outer extremities (the word "outer" having reference to the axis of rotation of the tire), these outer portions being connected by a casing tread portion 17, whereby the annular tire casing, including the side walls 15 and the tread wall 17, is removable from the clenchers 18 on the rim 19 as a unit. The tread portion 17 of the casing is substantially flat cross-wise of the tire whereby the inner tube 20 lies substantially flat cross-wise at each place between the beads and provides a cross sectional constuction of widely spaced apart outer side wall portions functionally similar to that of Fig. 1.

The cross bars or plates 22 and 23 are similar in general character to those of Fig. 1 of my said co-pending application, in which relatively narrow plates are arranged side by side around the tire. In Figs. 2, 3 and 4 there are similar clencher elements 24 at the ends of the plates adapted to engage the beads 16. In Figs. 1, 5 and 6 the plates are shown as being bent to engage the straight-side beads 9. In both forms the ends of the plates 22 and 23 are bent inward to provide means for engaging the beads respectively.

In Fig. 1 the plates 22 are held flexibly yet inexpansibly side by side by an annular inexpansible ring-shaped strip of metallic mesh 26 secured to the plates by a rivet 27 in each end portion of each plate. Between the mesh 26 and the several plates 22 I provide an annular layer of rubber compound 28, which, upon vulcanization in the vulcanizing mold flows between edge portions of the plates 22, and also around and between the meshes of the fabric 26, thus providing between the plates, and between the plates and the mesh fabric, a cushion and a seal of rubber material. In the device of Fig. 2 the rubber compound strip 30 between the plates 23 and the fabric 31 performs a similar function to that of the rubber 28 of Fig. 1. The fabric 31 is composed preferably of a continuous winding of frictional fabric in layers until a body thereof is formed adapted to withstand the outwardly directed pressure of the inner tube. This fabric strip 31 is thus a flexible and inextensible unit, and is held to the plates respectively by vulcanizing as well as by the rivets 33.

The interlocking means between the tread and the tire walls or casing comprise broadly a projecting part or parts on one unit and a corresponding recess on the other. The construction is substantially that of a mortise and tenon or tongue and groove. In Figs. 1, 5 and 6 the plates 22 have outwardly extending recesses 35, and each of the side walls 8 is provided with a plurality of projections 36 spaced apart annularly, the projections 36 being adapted to interfit with the recesses 35. In the structure of Fig. 2 the plates 23 have a longitudinal projection 37 in engagement with a similar recess 38 in the tread wall 17 of the tire casing. The rib-like projections and corresponding recesses are preferably long transversely so as to afford a strong interengagement cross-wise of the tire.

The plates 22 and 23 are preferably of metal having strength and resiliency whereby they may be of light weight while adapted to withstand shocks of impact in service. In my present practice the plates 22 and 23 are of steel, substantially one-half inch in width, about three thirty-seconds of an inch thick, and of a length appropriate for any particular cross section of tire being made.

After forming a ring of the plates 22 and 23 secured to the inextensible element, as 26 or 31, this ring is covered with rubber compound, placed in a mold and vulcanized to produce the wear tread portion, as 40 or 41. I may place an additional ring of fabric, wire mesh or the like 42 within the body of the tread, as shown in Fig. 1 for special uses.

By providing interlocking means between the plate and the tire side walls or casing I produce an exceedingly tight and strong relationship between the casing and the removable tread device when the tire is inflated, and secure a coaction between the casing or side walls and the tread which prevents creeping or slippage of the tread device upon the tire body while maintaining the flexible character of the interfit between the two. The avoidance of such creepage saves the tire side walls from being rubbed or chafed unduly by the inturned ends of the plates and also avoids a tendency to dislocate the inner fabric, as 13, Fig. 1, adapted to protect the inner tube. In addition it gives the tire as a whole a character of rigidity and firmness of associated parts which contributes to resiliency in action. Another important function of the elevations or depressions in the plates (which I produce simply by stamping), is that the plates are materially strengthened whereby they may be of lighter material than would otherwise be called for.

An important feature of the form of tread device shown is in the fact that when the wear portion 40 or 41 becomes greatly reduced in thickness, as when such wear reaches the flexible ring 42, Fig. 1, or the rivets 33, Fig. 2, the tread device may be rehabilitated by simply vulcanizing additional rubber material thereon.

I claim:

A tire tread plate adapted to lie crosswise of and upon the periphery of a tire, said plate having its end portions formed to engage beads on the opposite sides respectively of the tire, the plate having a stamped-up projection adapted to interfit with a corresponding recess on the peripheral surface of the tire, and means for holding the plate upon the tire tread.

DE LEON DAVIS.